No. 678,048. Patented July 9, 1901.
C. S. SMITH.
WHEEL BEARING FOR VEHICLES.
(Application filed Sept. 16, 1899.)
(No Model.)
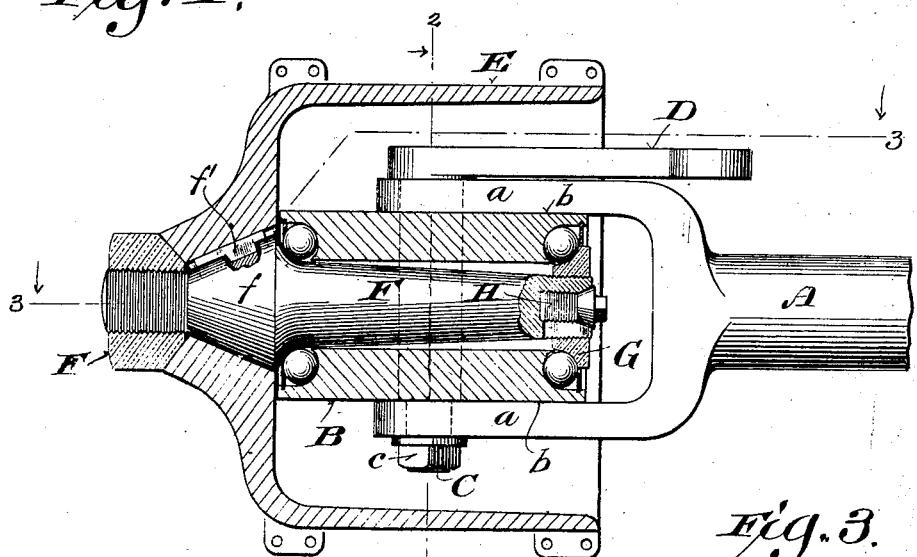
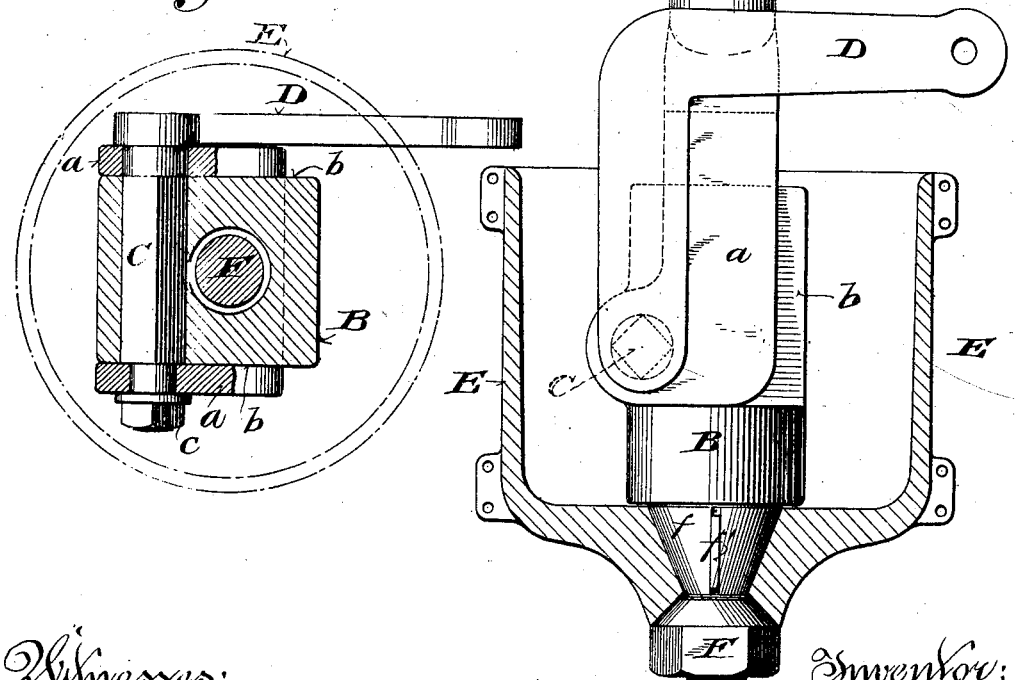
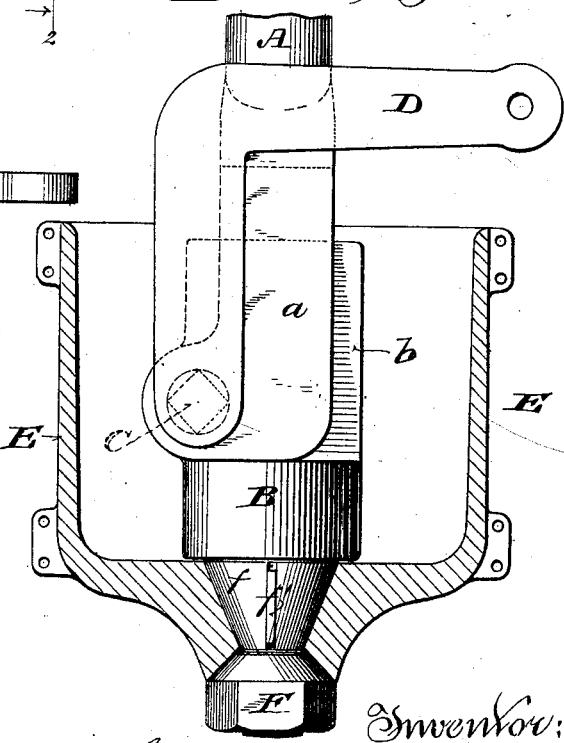

UNITED STATES PATENT OFFICE.

CHARLES S. SMITH, OF MILWAUKEE, WISCONSIN.

WHEEL-BEARING FOR VEHICLES.

SPECIFICATION forming part of Letters Patent No. 678,048, dated July 9, 1901.

Application filed September 16, 1899. Serial No. 730,683. (No model.)

*To all whom it may concern:*

Be it known that I, CHARLES S. SMITH, a citizen of the United States, residing at Milwaukee, in the county of Milwaukee and State of Wisconsin, have invented certain new and useful Improvements in Wheel-Bearings for Vehicles, of which the following is a specification, reference being had to the accompanying drawings, forming a part thereof.

The main object of my invention is to improve the construction and operation of devices of the class to which the invention relates.

It consists in certain novel features of construction and arrangement and in the combinations of parts, as hereinafter particularly described, and pointed out in the claims.

In the accompanying drawings like letters designate the same parts in the several figures.

Figure 1 is a vertical axial section of a wheel-hub and its bearing connections embodying my invention. Fig. 2 is a vertical cross-section on the line 2 2, Fig. 1; and Fig. 3 is a horizontal section on the broken line 3 3, Fig. 1.

For the purpose of illustration I have shown my invention as applied to one of the front or steering wheels of an automobile; but it may be applied with advantage to other vehicles, and certain improvements hereinafter described as a part of the invention are applicable to other than steering-wheels.

A designates one end of the front axle of an automobile. It is intended to be rigidly secured to the running-gear and may be forked, as shown, the fork-arms $a$ $a$ being arranged one above the other and preferably bent forward at their outer ends, which are perforated in line with each other, as shown in Figs. 2 and 3; but the lower fork-arm may be omitted if the upper one is made sufficiently large and strong.

B is an axle box or barrel formed on the upper and under sides with parallel bearing-faces $b$ $b$, which are accurately fitted between the inner faces of the fork-arms $a$ $a$. At its outer end beyond the fork-arms the box may be made of cylindrical form, as shown, or its bearing-faces $b$ $b$ may be extended to or nearly to its outer end. On the front side of its bore and transversely thereto a hole is formed through the box to receive a pin or bolt C, by means of which the box is pivotally connected with the outer ends of the fork-arms $a$ $a$. The ends of the pivot pin or bolt are made cylindrical, so as to turn freely in the holes in the ends of the arms $a$ $a$, and the intermediate portion may be squared to fit and prevent its turning in the squared hole in said box, the lower end being extended below the lower fork-arm and threaded to receive a nut $c$ and the upper end being formed with or rigidly attached to a steering-arm D, which extends inwardly and is connected in any suitable manner with the steering lever or handle. (Not shown.) The pivot-pin C may be conveniently forged in one piece with the steering-arm D, and the diameter of the upper cylindrical portion of said pin is at least equal to the diagonal of the squared portion, while the diameter of the lower cylindrical portion is made smaller, so that the parts may be easily assembled by inserting said pin through the upper fork-arm. The pivot-pin may, however, be made cylindrical and clamped or keyed in the box B.

The extended bearing-face $b$ on the upper side of the box B and the opposing face of the upper fork-arm $a$ serve to relieve the pivot pin or bolt C of lateral or bending strain and to hold the wheel firmly against any tendency caused by sluing or striking obstructions to oscillate or tip out or in at the top and bottom, at the same time allowing the wheel to turn freely sidewise on an approximately vertical line passing through or near the bearing-point in the tread of the wheel for the purpose of turning and guiding the vehicle.

E is a hollow wheel-hub open at its inner end to receive the end of the axle and the box B, carried thereby. It is provided with a central spindle F, which is attached at its outer end to the outer end of the hub and extends axially inward therefrom. It is preferably made separate from the hub and is threaded at its outer end and secured in the hub by a nut F. Next to or near its threaded end said spindle is formed with an enlarged cone-shaped bearing $f$, which is fitted in a cone-shaped seat formed in the hub, and when drawn tightly by the nut into said seat firmly supports and holds said spindle exactly in the axial center of the hub or wheel. A key f' holds the spindle from turning in the hub when the nut is turned on or off. The nut may, however, be dispensed with and the spindle screwed into the hub itself.

The spindle F is fitted to turn in the box B, which is preferably provided in the ends with ball races or bearings, while said spindle is provided with opposing cones or bearings, as shown in Fig. 1. The cone G at the inner end of said spindle is made detachable and adjustable for the purpose of assembling the parts and of taking up wear or play. It may be adjustably fastened upon the spindle by any suitable means. I have shown for this purpose the cone threaded upon the spindle, which is split at its inner end and provided with an expanding-screw H, having a cone-shaped head adapted to spread the end of the spindle inside of the cone, and thereby lock the same in place. For the purpose of inserting and securing the spindle F in the box B and of adjusting the cone G the hub E may be removed from said spindle, or said cone may be inserted through the open end of the hub and the open space between the inner end of the fork on the axle and the inner end of the box B.

The pivot-pin C being located within the hub in the plane of the wheel and in an approximately vertical line passing through or near the bearing-point in the tread of the wheel, the wheel pivots in swinging sidewise centrally on its bearing against the ground, and the least possible force is required to turn the wheel and hold it to its true course in steering and guiding the vehicle.

The box B being connected on the outside with the axle receives within it the spindle F, so that the ball-bearings of the smaller diameter turn within those of the larger diameter, and both the inner and outer bearings can be made of much smaller circumference and hardened more easily and perfectly than they could be if they were located outside of the box. Fewer antifriction-balls are thus required, and being turned by the smaller bearings they make fewer revolutions than they would if they were turned by the larger bearings. Friction and wear are thus reduced, and the wheel is made to revolve with greater freedom.

The box B being pivoted midway between its ends and in front of its axis to the axle, the draft exerted through the axle upon the wheel tends to hold the box and spindle F in line with the axle and the wheel in a plane perpendicular thereto. In this way the force required to keep the vehicle running in a straight course is reduced to the lowest degree. For certain uses, as for the hind wheels of vehicles, the box B may be rigidly attached to the axle and other distinctive features of the device employed to advantage.

Various changes in minor details of construction may be made without affecting the principle and operation of the device and without departing from the spirit and intended scope of my invention.

I claim—

1. The combination of an axle provided at the end with a box which has ball-bearings, a spindle adapted to turn in said box and provided with opposing ball-bearings one of which is detachable and adjustable, and a hollow wheel-hub open at its inner end to receive said box, spindle and ball-bearings and centrally attached at its outer end to the outer end of said spindle, substantially as and for the purposes set forth.

2. The combination of an axle forked at the end, a box pivoted in the forked end of said axle and provided with ball-bearings, a spindle loosely fitted in said box and provided with ball-bearings opposing the ball-bearings of said box, one of the ball-bearings on said spindle being detachable and adjustable, and a hollow wheel-hub open at its inner end to receive the end of the axle and the box pivoted therein and centrally attached at its outer end to the outer end of said spindle, substantially as and for the purposes set forth.

3. The combination of a forked axle having horizontally-disposed bearing-faces on the inner sides of the fork-arms, a box pivoted to said fork-arms in a line at right angles to said bearing-faces and in advance of the axis of the box and formed on the top and bottom with plane parallel bearing-faces snugly fitting against the opposing bearing-faces on said fork-arms, a hollow wheel-hub open at its inner end to receive said box, and a spindle centrally attached at its outer end to the outer end of said hub and extending axially inward therefrom into said box, in which it is rotatably held by balls and ball-bearings, substantially as and for the purposes set forth.

4. The combination of a forked axle, a box pivoted between the fork-arms of said axle, a spindle fitted to turn in said box and provided at its outer end with a cone-shaped bearing, and a hollow hub open at its inner end to receive the end of the axle with the box pivoted therein, and formed at its outer end with a central conical seat in which the conical bearing of said spindle is fitted and secured, substantially as and for the purposes set forth.

5. The combination of a forked axle, a box pivoted between the fork-arms of said axle, a spindle fitted to turn in said box and formed at its outer end with a conical bearing and a reduced screw-threaded extension beyond said bearing, a hollow wheel-hub open at its inner end to receive the forked end of the axle with the box pivoted therein and formed in its outer end with outwardly and inwardly diverging central conical seats, the conical bearing on said spindle fitting into the inner conical seat in said wheel-hub, and a nut fitted on the screw-threaded end of said spindle and having a conical face fitting into the outer conical seat in said wheel-hub, substantially as and for the purposes set forth.

6. The combination of a forked axle, a box pivoted at one side of its axis between the fork-arms of said axle by a pin passing vertically through said box and the fork-arms, a hollow wheel-hub open at its inner end to receive the forked end of the axle with the box pivoted therein and provided with an axial spindle attached centrally to its outer end and adapted to turn in said box, and a steering-arm attached to one end of said pivot-pin and extending therefrom on the outer side of the adjacent fork-arm of the axle through the inner open end of said hub, substantially as and for the purposes set forth.

7. The combination of an axle provided at the end with a box, a spindle fitted to turn in said box and provided at its outer end with a cone-shaped bearing, and a hollow hub open at its inner end to receive said box and formed at its outer end with a central conical seat in which the conical bearing of said spindle is fitted and secured, substantially as and for the purposes set forth.

8. The combination of an axle provided at the end with a box, a hollow wheel-hub open at its inner end to receive said box and formed centrally in its outer end with inwardly and outwardly diverging conical seats, a spindle fitted to turn in said box and formed at its outer end with a conical bearing which is fitted and secured in the inner seat of said hub and with a screw-threaded extension beyond said bearing, and a nut threaded on said extension and having a conical face fitted in the outer seat in said hub, substantially as and for the purposes set forth.

In witness whereof I hereto affix my signature in presence of two witnesses.

CHARLES S. SMITH.

Witnesses:
  CHAS. L. GOSS,
  KENT H. FLANDERS.